United States Patent

Alexeff

[15] 3,637,121
[45] Jan. 25, 1972

[54] WEB GUIDING AND SPREADING APPARATUS

[72] Inventor: Alexander V. Alexeff, Cleveland, Ohio
[73] Assignee: Alexeff-Snyder Enterprises, Inc., Cleveland, Ohio
[22] Filed: June 26, 1969
[21] Appl. No.: 836,737

[52] U.S. Cl. ................................................ 226/17, 26/67
[51] Int. Cl. .......................................................... B65h 25/26
[58] Field of Search ............... 226/17, 199; 26/66, 67, 51.4, 26/51.5

[56] References Cited

UNITED STATES PATENTS

| | | |
|---|---|---|
| 1,875,777 | 9/1932 | Tackaberry ............................ 226/17 |
| 1,919,291 | 7/1933 | Coolidge ............................ 226/17 X |
| 2,718,046 | 9/1955 | Sutton ................................ 26/66 X |
| 3,147,898 | 9/1964 | Huck ..................................... 226/17 |
| 2,595,325 | 5/1952 | Baumgartner ..................... 226/199 X |
| 3,162,391 | 12/1964 | Westcott ........................... 226/199 X |

Primary Examiner—Richard A. Schacher
Attorney—Oberlin, Maky, Donnelly & Renner

[57] ABSTRACT

Apparatus includes plural expander or guide heads adjacent opposite edges of fabric web material to be guided, with a drive between two or more expander heads for simultaneous adjustment of one by another for movement of the expander heads in and out of the fabric path or varying the cant angles. Remote controls may also be provided and operated either automatically or manually to effect such adjustments of the expander heads.

13 Claims, 6 Drawing Figures

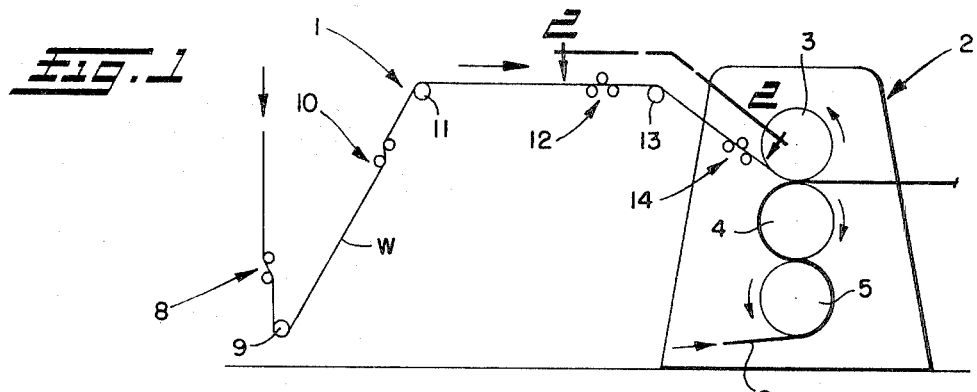
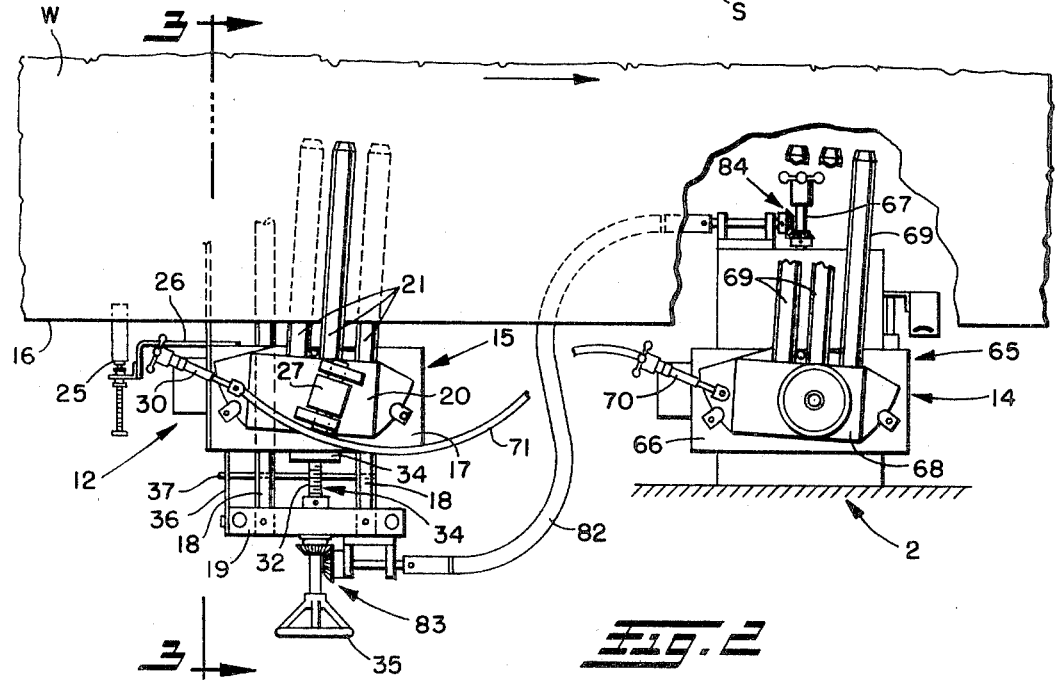
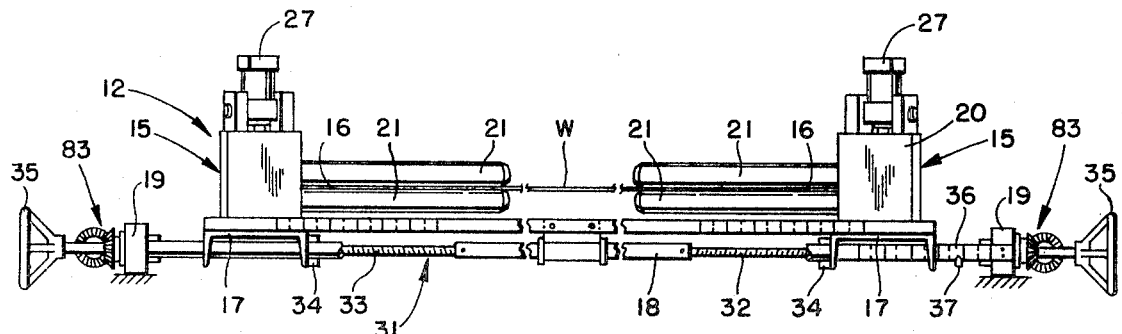

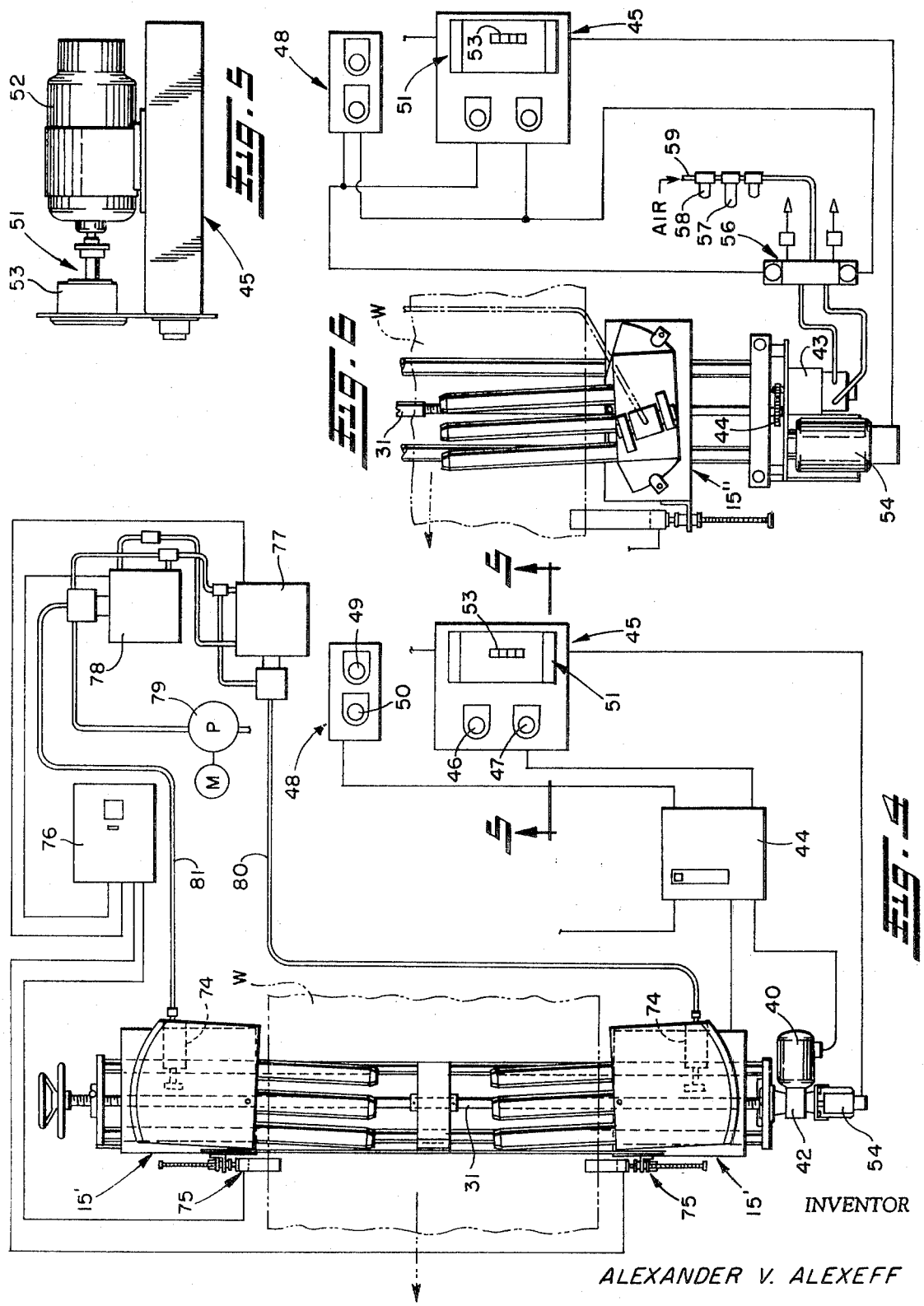

WEB GUIDING AND SPREADING APPARATUS

BACKGROUND OF THE INVENTION

This invention generally relates to a fabric guiding and spreading apparatus which may readily be adjusted to accept fabric material of different widths and precisely maintain the desired fabric width during processing thereof.

In the continuous processing of indefinite lengths of fabric or web material, it is generally necessary to use guiding equipment for maintaining the fabric material in line with the processing equipment. Moreover, certain types of fabric material such as tire fabric have the tendency to contract or shrink during processing, thus necessitating the use of expanders for maintaining the proper width of fabric material to assure the tire builder of a fabric material of the desired width for a particular sized tire. It is also desirable to be able to control the cord count of tire fabric material to achieve the desired uniform cord spacing across the fabric width for proper tire quality, which can be effectively accomplished by spreading the fabric material during processing adjacent the edges thereof where shrink age is the greatest.

For precise control of such fabric width and cord count, it is generally necessary to use a plurality of guiding and expanding heads. However, unless each piece of equipment is properly adjusted to perform its own particular function, precise results cannot be obtained, and experience has shown that accurate adjustment is often difficult and sometimes impossible to achieve using present day trial and error methods of physically observing the fabric and then manually adjusting each piece of equipment separately. The task is made even more difficult when the same equipment is used to process fabric material of different widths, gauge, and cord count, as is usually the case, since after the equipment is properly set up to handle one type or size of fabric strip material, the operator must manually readjust all of the equipment to accommodate another type or size of fabric material, and the chances of repeating the precise settings by hand for uniform handling of the same type of fabric material at a later date are remote.

Moreover, during processing, the equipment must be continuously watched and maintained, which is usually not possible by one operator where several pieces of equipment are involved, and oftentimes one or more pieces of equipment are located in difficult to reach or hazardous locations, in which event adjustments are sometimes ignored altogether.

SUMMARY OF THE INVENTION

With the foregoing in mind, it is a principal object of this invention to provide a web guiding and spreading apparatus including plural guiding and expander heads suitably interconnected together so that adjustments of one head will cause similar adjustments of another.

Another object is to provide such apparatus in which the guiding and expander heads are located adjacent opposite edges of the fabric material, with means providing for simultaneous movement of the expander heads in and out as a system for accommodating fabric of different widths.

Still another object is to provide such apparatus in which the cant angles of two or more of such guiding and expander heads may be adjusted simultaneously.

A further object is to provide such apparatus with remote control and readout which may be operated manually or automatically for controlling such adjustments of the guiding and expander heads.

Yet another object is to provide such apparatus with axially adjacent expander heads, one for controlling fabric width, and the other for controlling cord count.

Another object is to provide such apparatus in which all or different combinations of guiding and expander heads are interconnected either mechanically or electrically to suit desired conditions of adjustment.

These and other objects of the present invention may be achieved by providing such apparatus with one or more guiding and expander heads adjacent opposite edges of the fabric material, and connected together for simultaneous movement of both heads in and out of the fabric path. Additional guiding and expander heads may be provided adjacent the same edge of the fabric material which may be interconnected either mechanically or electrically for simultaneous adjustment of the relative locations of such heads adjacent the fabric edge or their respective cant angles. Remote controls may also be provided either automatically or manually operable for adjusting the various heads, which is particularly desirable where the heads are located in inaccesible or hazardous areas.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of a few of the various ways in which the principles of the invention may be employed.

BRIEF DESCRIPTION OF THE DRAWING

In the annexed drawing:

FIG. 1 is a schematic side elevation view of a preferred form of guiding and spreading apparatus in accordance with this invention shown in use in a fabric-processing line for calendering tire fabric material;

FIG. 2 is an enlarged fragmentary top plan view of the apparatus of FIG. 1 as seen from the plane of the line 2—2 thereof;

FIG. 3 is an end elevation view of the left hand expander heads of FIG. 2 as seen from the plane of the line 3—3, but rotated 90° for convenience in drawing;

FIG. 4 is a fragmentary schematic top plan view of another form of guiding and spreading apparatus in accordance with this invention;

FIG. 5 is an enlarged fragmentary vertical section through the remote readout control panel of FIG. 4, taken on the plane of the line 5—5 thereof; and FIG. 6 is a fragmentary schematic top plan view of an apparatus generally similar to that shown in FIG. 4 except that a fluid drive motor is used in place of the electric drive motor of the FIG. 4 embodiment for moving the expander heads in and out.

DESCRIPTION OF THE PREFERRED EMBODIMENTS

Referring now in detail to the drawing and first especially to FIG. 1, there is shown a preferred form of fabric or web guiding and spreading apparatus 1 including a plurality of guiding and spreading or expander heads arranged in a fabric-processing line for guiding the fabric material W through one or more pieces of fabric-processing equipment, as for example, a calender 2 which may comprise a pair of counterrotating calender rolls 3 and 4 between which the fabric material is fed for embedding the fabric material in elastomeric stock S also fed between such calender rolls from beneath by a feed roll.

Although the number and type of equipment which comprise the apparatus 1 may vary depending upon the type of material being guided, the preciseness and extent of width and cord count to be maintained and type of processing equipment through which the web material is being guided, the first piece of equipment shown in the guiding and spreading process is a centering guide 8 whose primary function it is to align the fabric or web material properly with respect to the centerline of the processing machinery. From the centering guide 8 the fabric material W passes around a single guide roll 9 and between the rolls of a spreading device 10 which roughly spreads the fabric to the desired width. Next the fabric material passes over another guide roll 11 and then through an expander 12 for expanding the material substantially to the desired width. Where tire cord fabric material is being processed, the expander 12 will also redistribute the fabric cords to some extent, but the exact final desired fabric width and cord count at the fabric edges will be controlled by an additional expander 14 through which the fabric material is fed next after passing over another guide roll 13.

For a more complete understanding of the details of construction and operation of the expanders 12 and 14 of the web guiding and spreading apparatus 1 of the present invention, reference may be had to FIGS. 2 and 3. As shown, the expander 12 comprises two expander or guide heads 15, one disposed adjacent each edge 16 of the fabric material W being processed. Such guide heads 15 are desirably of identical construction, including a carriage 17 mounted on a pair of laterally spaced guide rods 18 extending transversely beneath the web material W and having their ends supported by fixed supports 19 adjacent opposite edges of the fabric material. On each of the carriages 17 there is a support stand 20 for one or more guide rolls 21. While three such guide rolls 21 are shown extending inwardly from each support stand 20 in cantilevered fashion with one edge 16 of the fabric material W threaded therebetween, it will be apparent that one or two of the guide rolls could be eliminated depending on how taut the fabric material is and the degree of stretching and guiding required.

In any event, the guide rolls 21 are journaled on shafts, and one or more of the shafts may be angularly adjustably mounted on the support stand 20 for movement into and out of engagement with the fabric material for increasing and decreasing the angle of wrap of the material around the guide rolls. The angular adjustment of the guide rolls 21 is such that they are moved at an angle so that engagement with the fabric material will always be greatest at the edges where the stretching is needed most and will progressively diminish in the direction of the centerline of the fabric material.

The particular manner in which the guide rolls 21 are angularly adjusted forms no part of this invention and will not be described in detail. Suffice it to say that edge sensors 25 of conventional type supported by brackets 26 on the respective carriages 17 for movement therewith are located adjacent each edge 16 of the fabric material and control in known manner the operation of an actuator 27 on the support stand 20 for effecting the desired movements of the adjustable guide rolls. Thus, for example, should the fabric pull inwardly from the edge sensor 25 adjacent one edge thereof, the actuator 27 will cause one or more of the guide rolls 21 to move angularly into engagement with the fabric, and movement of the web edge outwardly of the edge sensor will have the reverse effect. As an example of the type of adjustable mounting that may be used for one or more of the guide rolls 21, reference may be had to the pending application of Alexander V. Alexeff and Harvey Snyder, U.S. Ser. No. 655,562, filed Sept. 5, 1967. Alternatively, two or more of the guide rolls may be mounted for movement as shown in U.S. Pat. No. 3,156,396, or other suitable means may be provided for that purpose.

To vary the cant angle of the guide rolls 21, the support stand 20 of each expander head 15 may be pivotally mounted on its carriage 17 and angularly adjusted as by rotation of an adjusting screw 30. In actual practice, a cant angle of approximately 5° in the direction of fabric flow has been found to be suitable for controlling the rate of expansion of the fabric material, but other angles may be preferred for certain applications.

Adjustment of the spacing between the expander heads 15 adjacent opposite edges of the fabric material may also be varied for accommodating different widths of fabric material as by providing separate screw shafts for each of the expander heads for individual adjustment of the same in and out with respect to the fabric edges or a single left-right-hand screw shaft 31 may be used as shown for simultaneous adjustment of such expander heads. The screw shaft 31 has its ends journaled for rotation of the fixed supports 19 and includes opposite hand threads 32 and 33 engaging nuts 34 on the respective carriages 17 adjacent opposite edges of the fabric material, whereby rotation of the screw shaft 31 in opposite directions will cause the expander heads to move toward and away from each other thus to move them in and out with respect to the fabric edges. Turning of the screw shaft 31 may be achieved manually as by providing a handwheel 35 on one or both ends of the screw shaft 31, and the actual distance between the expander heads 15 may be measured as by providing a scale 36 extending transversely of the fabric material between the expander heads and secured to the guide rods 18, with a pointed 37 on one or both of the carriages 17 which is slidable with respect to the ends of the scale for measuring the distance between the expander heads.

Preferably, however, rotation of the screw shaft 31 is achieved by means of a drive motor, which may be an electric drive motor 40 suitably coupled to the screw shaft 31 through a reducer 42 as shown in FIG. 4, or the drive motor may be a fluid motor 43 having a gear drive 44 with the screw shaft 31 as illustrated in FIG. 6. Such a motor drive permits remote control of the in and out movements of the expander heads, which is particularly desirable as where the expander heads are located in inaccessible or hazardous locations.

For actuating the electric drive motor 40 of FIG. 4, there is provided a reversible starter 44 which may be controlled from a remote readout and control panel 45 having a pair of pushbutton switches 46 and 47, the switch 46 being the "IN" switch for driving the motor 40 in a direction causing inward movement of the expander heads 15' toward the adjacent edges of the fabric material, and the switch 47 being the "OUT" switch for driving the motor in the reverse direction to cause outward movement of the expander heads. A local control panel 48 may also be provided having "IN" and "OUT" buttons 49 and 50 for actuation of the reversible starter 44 and electric drive motor 40 associated therewith to permit the operator to vary the expander width while physically observing the fabric from a strategic position near the fabric.

Visual observation of the fabric is not always possible from a remote location where the remote readout control panel 45 might be located, and accordingly, there is desirably in that unit a width measurement device 51, which may comprise a selsyn receiver 52, best seen in FIG. 5, for turning a counter 53 in response to signals from a selsyn transmitter 54 driven by the screw shaft 31. Since there are a fixed number of screw threads on the shaft 31 per linear inch, displacement of the expanded heads may be measured by counting the revolutions of the screw shaft. Moreover, by setting the counter 53 to a value, a direct reading of fabric width can be made on the counter.

Where there is a fluid drive motor 42 as shown in FIG. 6, the same remote readout control panel 45 and local control panel 48 may be used for controlling actuation of a solenoid valve 56 which when actuated in opposite directions supplies fluid, preferably air, from a suitable source to opposite ends of the fluid drive motor 43. A suitable pressure gauge 57 and filters 58 may be provided in the air line 59 as desired. As before, the exact position of the expander heads 15" may be determined by transmission of signals from a seslyn transmitter 54 on the screw shaft 31 back to the seslyn receiver 52 of the width measurement device 51. The counter 53 may be of a type which will in turn give a digital readout so that there is no need for the operator to interpolate a setting, and will read the exact fabric width at the point of expansion.

With such a construction, reliable and rapid adjustments of the width or spacing between the expander heads may be made to accommodate different fabric widths, as for example, changing from 60-inch fabric to 30-inch fabric, or any size in between. The counter 52 may also be connected to a recorder for recording width settings, and the control unit 45 may be coupled to a computer for computer control of fabric width if desired.

Referring once again to FIG. 2, the expander 14 which is located adjacent the entrance to the calender 2 also consists of a pair of expander heads 65, one located adjacent each of the fabric edges. Such expander heads 65 may be of a construction generally similar to the expander heads 15 previously described, including a carriage 66 mounted for movement in and out with respect to the adjacent fabric edges upon turning of a screw shaft 67 in opposite directions, and having a support stand 68 pivotally mounted on the carriage 66 for adjustment of the cant angle of the guide rolls 69 projecting therefrom as by rotation of an adjusting screw 70. The shafts on which the guide rolls 69 are journaled may be cantilevered at their outer ends, similar to the roll shafts for the guide rolls 21 previously described, and one or more of the guide rolls 69 may be angularly adjustable for increasing or decreasing the angle of wrap of the fabric material around the guide rolls with the amount of wrap being greatest at the fabric edge and progressively diminishing in the direction of the fabric center line. However, since the expander 12 substantially controls the fabric width, the expander 14 is primarily used to control cord count and final expansion up to one-fourth inch which may be effectively accomplished merely by varying the cant angle of the guide rolls 69 to vary the rate of expansion of the fabric.

Such angular adjustment of the cant angle of the guide rolls 69 may be performed manually as aforesaid to provide vernier adjustment of the fabric width and control fabric cord count at the edges thereof. However, experience has shown that varying the cant angle of the first expander heads 15 along with the expander heads 65 will aid the expander heads 65 in achieving better cord count. Accordingly, once the cant angles of the various expander heads 15 and 65 are properly adjusted to perform their precise functions, it is preferred that the respective adjusting screws 30 and 70 for such expander heads be interconnected as by means of a flexible drive shaft 71 therebetween, whereby adjustment of the cant angle of the expander 12 will automatically simultaneously adjust the cant angle of the expander 14 and vice versa, thus maintaining their relative positions intact. Such cant angle adjustments may be made manually as aforesaid, or automatic control of the cant angle of one or both expanders 12 and 14 may be achieved as by substituting fluid actuators 74 for the adjusting screws 30 as shown in FIG. 4 to which fluid is automatically supplied as required by appropriate edge sensors 75 which transmit an electric signal to an amplifier 76 where it is amplified and conveyed to control units 77 and 78 for directing hydraulic fluid from a motor driven pump 79 to the respective fluid lines 80 and 81 to the fluid actuators. Similar automatic controls may be used for angularly adjusting the disposition of the guide rolls 21 to increase and decrease the extent of wrap of the fabric around the rolls.

Inward and outward adjustment of the expander heads 65 may also be accomplished automatically by connecting the same to the expander heads 15 either mechanically or electrically for inward and outward movement of the expander heads 65 with the expander heads 15. In FIG. 2, a flexible shaft 82 is shown interconnecting the screw shafts 31 and 67 of the respective expander heads 15 and 65 through suitable beveled gearing 83, 84. Accordingly, rotation of the screw shaft 31 either manually or automatically from a remote location will cause corresponding inward and outward movement of the expander heads 65. Similar connections may be made between other guiding apparatus in the system for achieving simultaneous adjustment of the cant angle or spacing of two or more guide roll heads during adjustments of one head. This means that adjustments of one piece of equipment to accommodate changes in the type and size of material being processed will automatically adjust other pieces of equipment connected thereto and thereby reduce the number of separate adjustments required by the operator for properly guiding and spreading different materials during a particular run. Thus, once the individual pieces of fabric guiding and spreading or expanding equipment have been adjusted individually to serve a particular function in the system, they can thereafter be readjusted as a system to maintain their relative positions intact and need not be further adjusted individually as is now being done, at a substantial savings in time and much increased accuracy.

I, therefore, particularly point out and distinctly claim as my invention:

1. In apparatus for guiding web material, a pair of guide heads adapted to be disposed adjacent opposite edges of the web material, each guide head including guide roll means for engaging opposite edges of the web material, drive means interconnecting said guide heads for movement toward and away from each other for accommodating web material of different widths, and remote control means for actuating said drive means, said drive means comprising a screw shaft having threads of opposite hand respectively threadedly engaging said guide heads for movement of said guide heads toward and away from each other upon rotation of said screw shaft in opposite directions, motor means for rotating said screw shaft in opposite directions, and width measurement means for automatically measuring the spacing between said guide heads, said width measurement means comprising a selsyn transmitter driven by said screw shaft, a selsyn receiver, and a counter driven by said selsyn receiver in response to signals from said selsyn transmitter.

2. In apparatus for guiding web material, plural guide heads adapted to be disposed adjacent each edge of the web material, said guide heads adjacent the same edge of the web material being axially spaced from each other, each guide head including guide roll means for guiding the web material, means for adjusting the relative positions of said guide roll means with respect to the web material, and means interconnecting selected ones of said guide heads adjacent the same edge of the web material for simultaneous adjustment of the guide roll means on said selected guide heads as a system, said means for adjusting the relative position of said guide roll means with respect to the web material comprising a pivotally mounted support stand for said guide roll means which is angularly adjustable to vary the cant angle of said guide roll means, and means for simultaneously adjusting the cant angle of at least two of said guide roll means.

3. The apparatus of claim 2 further comprising means for adjusting the relative positions of said guide heads with respect to the web material, and means interconnecting selected ones of said guide heads adjacent the same edge of the web material for simultaneous adjustment of said selected guide heads as a system.

4. The apparatus of claim 3 wherein said means for adjusting the relative positions of said guide heads comprises adjusting screws for said guide heads, and means interconnecting the respective adjusting screws of said selected guide heads for effecting the desired adjustments of said guide heads by rotation of one of said adjusting screws.

5. In apparatus for guiding web material, plural guide heads adapted to be disposed adjacent each edge of the web material, said guide heads adjacent the same edge of the web material being axially spaced from each other, each guide head including guide roll means for guiding the web material, means for adjusting the relative positions of said guide roll means with respect to the web material, and means interconnecting selected ones of said guide heads adjacent the same edge of the web material for simultaneous adjustment of the guide roll means on said selected guide heads as a system, said means for adjusting the relative position of said guide roll means with respect to the web material comprising means mounting said guide roll means for angular adjustment to vary the angular engagement and thus the extent of wrap of the web material around said guide roll means.

6. The apparatus of claim 5 further comprising means for adjusting the relative positions of said guide heads with respect to the web material, and means interconnecting selected ones of said guide heads adjacent the same edge of the web material for simultaneous adjustment of said selected guide heads as a system.

7. The apparatus of claim 6 wherein said means for adjusting the relative positions of said guide heads comprises screws shafts having threads of opposite hand respectively threadedly engaging one guide head adjacent each edge of the web material for movement of said guide heads toward and away from each other upon rotation of said screw shafts in opposite directions, means for rotating one of said screw shafts in opposite directions, and means interconnecting said screw shafts whereby rotation of said one screw shaft causes rotation of the other screw shaft.

8. In apparatus for guiding web material, plural guide heads adapted to be disposed adjacent each edge of the web material said guide heads adjacent the same edge of the web material being axially spaced from each other, each guide head including guide roll means for guiding the web material, means for adjusting the relative positions of said guide roll means with respect to the web material, and means interconnecting selected ones of said guide heads adjacent the same edge of the web material for simultaneous adjustment of the guide roll means on said selected guide heads as a system, said means for adjusting the relative positions of said guide roll means comprising adjusting screws for each of said guide heads, and means interconnecting the respective adjusting screws of the selected guide heads for effecting the desired adjustments of said guide roll means by rotation of the adjusting screw for one of said guide heads, said means interconnecting selected ones of said guide heads adjacent the same edge of the web material comprising a flexible shaft interconnecting the respective adjusting screws of said selected guide heads for rotation of one of said adjusting screws by rotation of another through said flexible shaft.

9. In apparatus for guiding web material, plural guide heads adapted to be disposed adjacent each edge of the web material, each guide head including guide roll means for guiding the web material, means for adjusting the relative positions of said guide heads with respect to the web material, and means interconnecting selected ones of said guide heads for simultaneous adjustment of said selected guide heads as a system, said means for adjusting the relative positions of said guide heads comprising adjusting screws for said guide heads, and means operated by rotation of said adjusting screws for effecting the desired adjustments of said guide heads, said means interconnecting selected ones of said guide heads comprising a flexible shaft interconnecting the respective adjusting screws of said selected guide heads for adjusting said selected guide heads through said flexible shaft by rotation of one of said adjusting screws.

10. The apparatus of claim 9 further comprising means for adjusting the relative positions of said guide roll means with respect to the web material, and means interconnecting selected ones of said guide heads adjacent the same edge of the web material for simultaneous adjustment of the guide roll means of said selected guide heads as a system.

11. The apparatus of claim 9 further comprising electric drive motor means for rotating one of said adjusting screws in opposite directions, a reversible starter for said drive motor means, and switch means for actuating said reversible starter.

12. The apparatus of claim 9 further comprising fluid motor means for rotating one of said adjusting screws in opposite directions, solenoid operated valve means which when actuated supplies fluid to said fluid motor means for driving the same in opposite directions, and switch means for actuating said solenoid valve means.

13. The apparatus of claim 9 further comprising drive means for rotating said one adjusting screw, and remote control means for actuating said drive means.

* * * * *